United States Patent [19]

Hills et al.

[11] 3,977,533

[45] Aug. 31, 1976

[54] CLASSIFYING APPARATUS

[75] Inventors: Eric George Hills; David Evans, both of London, England

[73] Assignee: The Post Office, London, England

[22] Filed: Feb. 11, 1974

[21] Appl. No.: 441,305

[30] Foreign Application Priority Data

Feb. 13, 1973 United Kingdom ................. 6919/73

[52] U.S. Cl. .............................. 214/1 M; 198/110; 235/61.11 R; 318/640; 197/19

[51] Int. Cl.[2] .......................................... B65G 15/00

[58] Field of Search ................ 198/19, 20 R, 21, 34, 198/37, 38, 40, 76, 110, DIG. 16; 214/1 M, 11 R, 11 A, 11 C; 209/73, 74, DIG. 1, 111.7 R; 250/223 R; 318/313, 640; 235/61.11 R, 61.11 E; 340/259; 271/202, 265, 270; 197/19

[56] References Cited

UNITED STATES PATENTS

| | | | |
|---|---|---|---|
| 3,311,224 | 3/1967 | King | 198/34 |
| 3,368,672 | 2/1968 | Heaney et al. | 209/74 R |
| 3,368,701 | 2/1968 | Copping et al. | 214/11 R |
| 3,802,548 | 4/1974 | Wentz et al. | 198/40 |

*Primary Examiner*—John J. Love
*Assistant Examiner*—Joseph E. Valenza
*Attorney, Agent, or Firm*—Kemon, Palmer & Estabrook

[57] ABSTRACT

Article classifying apparatus comprises means for conveying articles in series to a work station. At the work station means are provided for establishing a machine readable classification code on each article. The apparatus also includes means for varying the speed of the conveying means.

12 Claims, 9 Drawing Figures

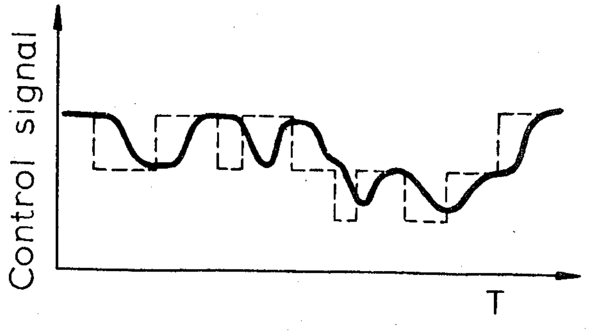
Fig. 5(iii).

CLASSIFYING APPARATUS

This invention relates to article classifying apparatus and is especially concerned with letter coding desks in which letters are successively presented to an operator for establishment by the operator of a multicharacter destination - signifying code for each letter.

In the past, sorting of letters has been performed by postmen whose method was to pick a handful of letters from an already faced stack, read the address on the top letter, and then place it manually into an appropriate compartment of a sorting fitting.

The actual function of placing letters into compartments can now be performed by letter sorting machines, but despite efforts to design automatic character-recognition apparatus, address reading continues at present to demand the intervention of an operator for whom each letter must be displayed while he extracts the necessary information from the face of the letter envelope. The display of letters for this purpose is termed letter presentation.

Whilst letter presentation is an essential feature of manually controlled letter sorting machines, automatic letter sorting machines only require recognition of sorting code patterns on moving letters which does not, in itself, necessitate presentation as defined. However, before automatic letter sorting can take place, the sorting code patterns must be printed on envelopes during passage through operator-controlled coding desks; here again letter presentation is necessary.

In some types of coding desks two letter presentation positions were provided, one above the other. This was considered advantageous because at the beginning of an operator's shift or during training of an operator, operations of both reading an address, and keying a code corresponding to the address, were carried out while the letter was stationary in the lower position whereas with much practice, an experienced operator could read the address of one letter in the upper presentation position while keying an appropriate multicharacter code corresponding to the address of another letter occupying and lower presentation position.

Various techniques have been employed for transporting letters from the upper to the lower presentation position, but a disadvantage has been that each position required assoicated mechanisms for bringing the letter into the presentation positions at high speed, halting it to enable reading of the address and then accelerating it away at high speed; such mechanisms have included brakes and clutches which are both costly and difficult to maintain.

In other types of coding desk the letters have been brought successively to the desk along a generally horizontal path, the letters being halted at a presentation position in front of the operator and then accelerated away on establishment by the operator of a multicharacter code for each letter.

It is a feature of all past coding desks known to the inventors, that they have utilised a letter presentation position or positions in which the letters have been stationary. In this respect, the rate at which codes could be established for the letters has been limited, among other considerations unique to the operator's abilities, by the time taken after establishment of a code for one letter to be accelerated away and for the next letter to be delivered to the presentation position and halted prior to the operator reading the address.

It is an object of the invention to reduce the minimum time that can be taken between the establishment of a code for one letter, and the operator beginning to read the address on the next letter.

It is another object of the invention to make this time purely dependent on the operators abilities.

According to the invention there is provided article classifying apparatus comprising conveying means for conveying articles seriatim past a work station, at which work station code establishing means are provided for establishing a classification code in the form of a machine-readable signal specific to each of the articles according to the identity of the article which is one of a plurality of articles arranged to be visible to an operator, the apparatus also including first control means for varying the speed of the conveying means in accordance with the position of the foremost visible article for which a code has not been established.

Preferably the first control means includes monitoring means, incorporating a shift register driven synchronously with the movement of the conveying means, said monitoring means being adapted to monitor the position of the foremost visible article for which a code has not been established, said monitoring means being arranged to provide an output signal having a predetermined relationship to the monitored position of the foremost article for which a code has not been established. The output signal is adapted to vary the speed of drive means for driving the conveying means.

When the classification code is a multicharacter code which is established by successively keying the characters of a keyboard, the apparatus may also include further control means for varying the speed of the conveying means in accordance with the number of characters of a code that have been keyed.

Two embodiments of the invention will now be described by way of example with reference to the accompanying diagrammatic drawings in which FIG. 1 is a front perspective view of a letter coding desk embodying the invention;

FIG. 5 (ii) shows a graphical representation of a speed control signal for the conveyor as a function of time T when codes are being keyed at a typical rate and the conrol circuit of FIG. 3 is being used;

FIG. 5 (iii) is a graphical representation similar to FIG. 5 (ii) but showing the effect on the control signal of using a saturable reactor between the control circuit and a motor driving the letter conveyor;

FIG. 5 (iv) shows a graphical representation similar to FIG. 5 (ii) but using the combined control circuits of FIGS. 3 and 4;

Figure 1:
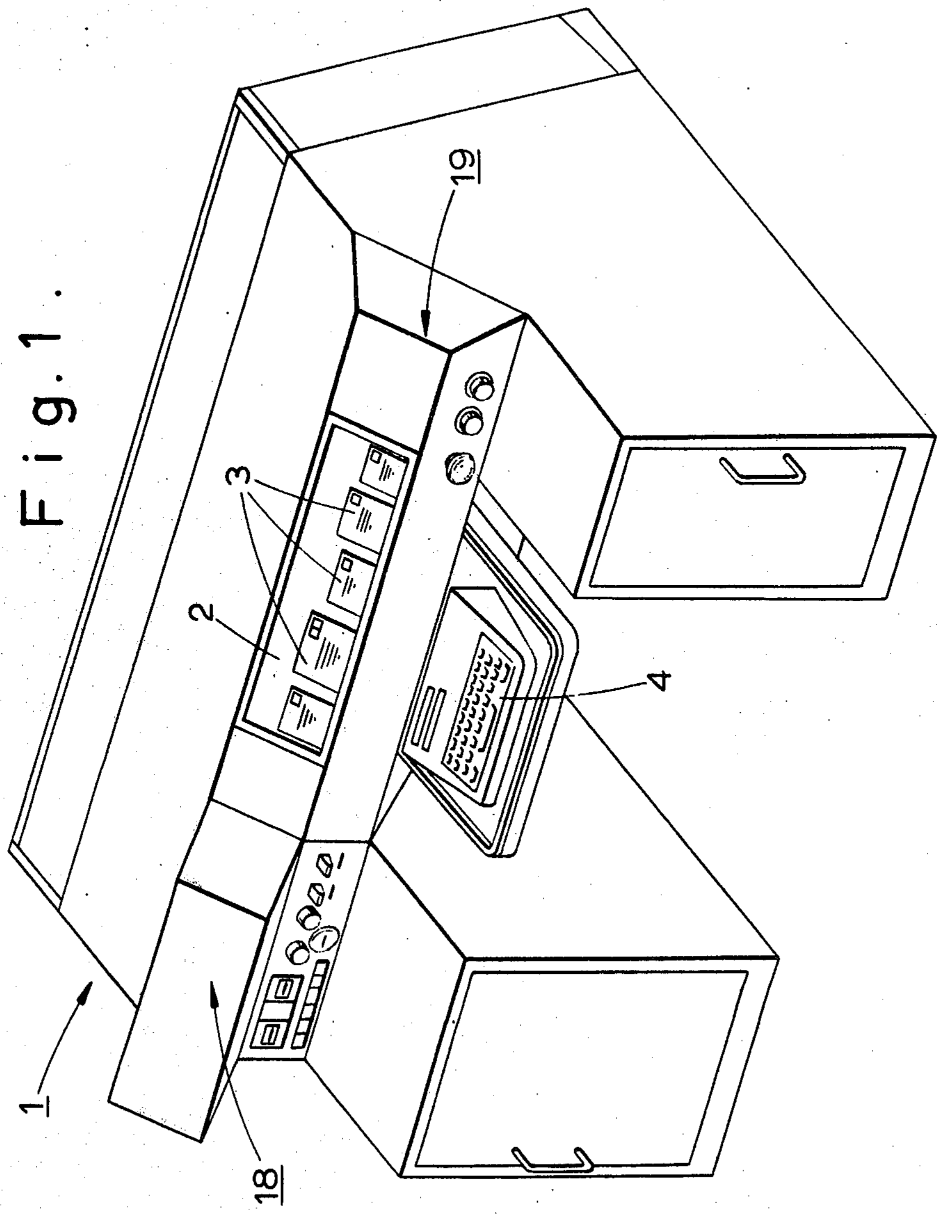

Referring to the drawings in detail, FIG. 1 shows a letter coding desk 1 embodying the invention. Generally, the coding desk has a viewing screen 2 along which a succession of letters 3 are moved, the letters being so positioned as to enable their addresses to be successively read by an operator who sits in front of the desk. According to the address on each letter, the operator keys an appropriate message at a keyboard 4 to establish a destination-signifying code for the letter.

Figure 2:
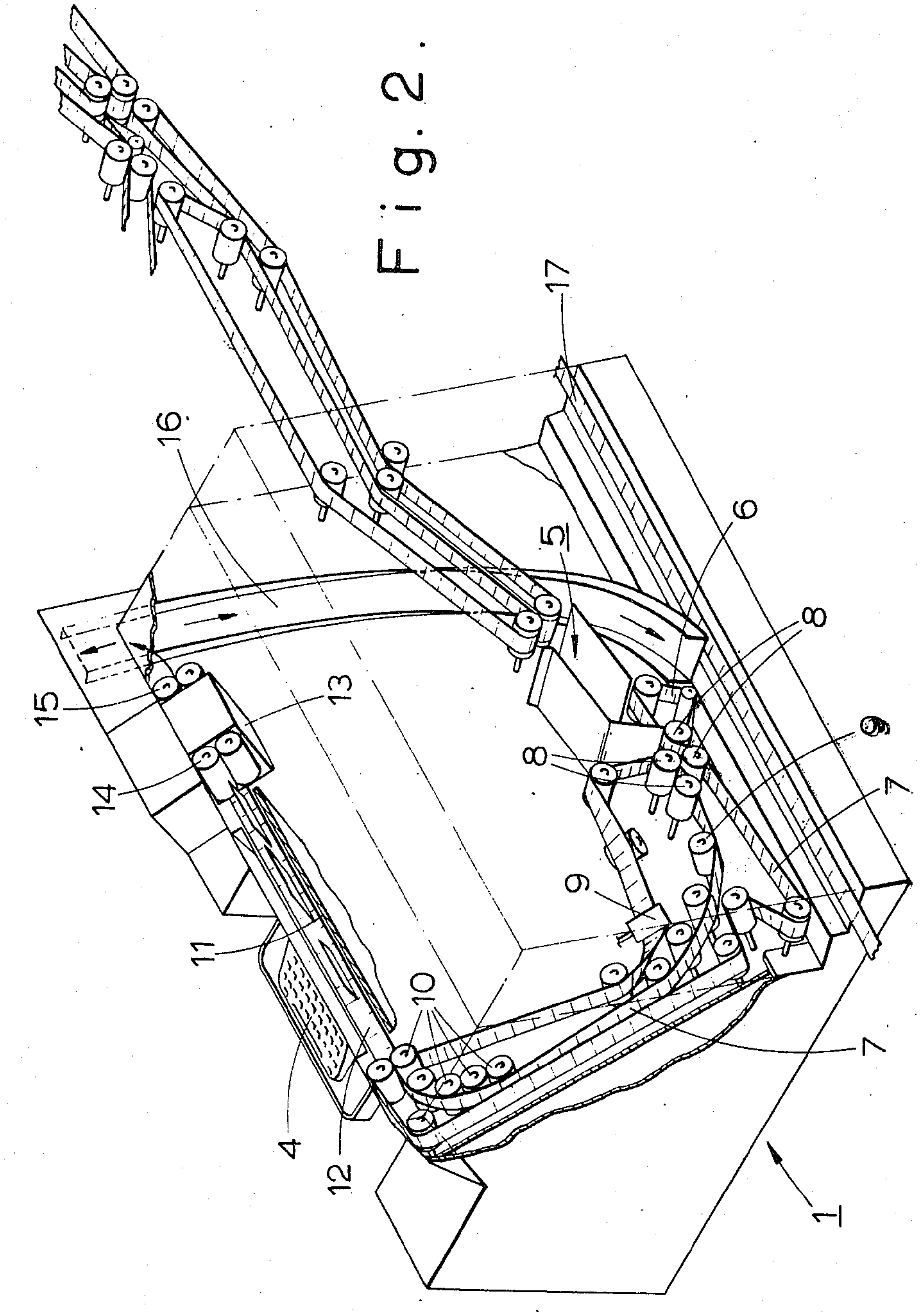
FIG. 2 is a rear perspective view of a letter coding desk, the desk being shown with a rear panel and part of a main desk housing cut away.

Referring to FIG. 2, the letter coding desk 1 has a letter storage compartment 5 in which a stack of letters to be coded is normally present, the stack being periodially replenished by means of a letter delivery mechanism. The lowest letter in the compartment 5 has its leading portion resting on the upper surface of a continuous frictional conveyor belt 6 and, in operation, is driven forwardly from underneath the stack by the belt 6. The letter is fed between a pair of conveyor belts 7 which are driven by one of a series of rollers 8, the other rollers acting to guide the conveyor belts 7. Drive to the drive roller is not shown. The letter is upwardly propelled by the conveyor belts 7 to the left hand corner of the coding desk 1 as shown on FIG. 2. The belts 7 are twisted at rollers 9 to a predetermined angle to the horizontal, preferably 50°, so that when each letter is released from between the belts 7 after passing over co-operating rollers 10 the letter drops onto a Formica (RTM) backed inclined platform 11 with its addressed side facing upwardly. The letter slides down the platform 11 until its lower edge contacts a narrow continuous conveyor belt 12 (FIG. 6) extending along the length of the viewing screen 2 and the platform 11. Drive to this belt, which will be termed the letter conveyor, is taken from one of a pair of rollers upon which it is mounted, the drive being taken via a bevel mechanism (not shown) from one of the rollers 10. The letter conveyor 12 acts on the lower edge of the letter 3 in frictional contract with it to convey the letter 3 across the viewing screen 2. In operation of the desk 1, letters 3 are delivered successively to the input end of the viewing screen shown at the left hand side of the desk 1 in FIG. 2.

The direction of letter delivery is important for optimum operator performance. Thus the delivery direction must be such that movement of letters in front of an operator is in such a direction as to facilitate address reading.

For languages where the letters of the words of an address are ordered from left to right, the optimum direction of travel for the letter is from right to left. For other languages, e.g. Arabic, the optimum direction of letter movement will be different.

The desk operator reads the addresses on the letters 3 as they move along the viewing screen 2 and according to the address shown on each letter, he keys an appropriate multicharacter code at the keyboard 4. On completion of keying each code a sorting code corresponding to the multicharacter code is stored in a memory bank i.e. a classification code for the letter is established. When the letter 3 reaches the output end of the viewing screen 2, it is fed to a print unit 13 at which the sorting code, extracted from the memory bank, is applied to the addressed face of the letter, for example by the impact of heated pins on a phosphorimpregnated tape held against the letter face. The code may subsequently be read by an automatic letter sorting machine details of which are not shown. A letter trailing-edge photo detector (not shown) precedes the print unit 13 and on actuation thereof, accelerating rollers 14 grip and accelerate the letter 3 into the print unit 13. The letter remains in the print unit 13 until a following letter 3 actuates the trailing-edge photodetector whereupon accelerating rollers 15 grip and accelerate the leading letter away from the print unit 13 to a deposit chute 16. The letter 3 slides down the deposit chute 16 and is ejected onto a continuously moving conveyor 17 for delivery to the sorting machine.

As shown in FIG. 1, the print unit 13 and the letter input rollers 10 are covered by housing members 18 and 19 respectively so that the coding desk operator can see movement of the letters 3 only when they are in the viewing screen 2.

Figure 3:
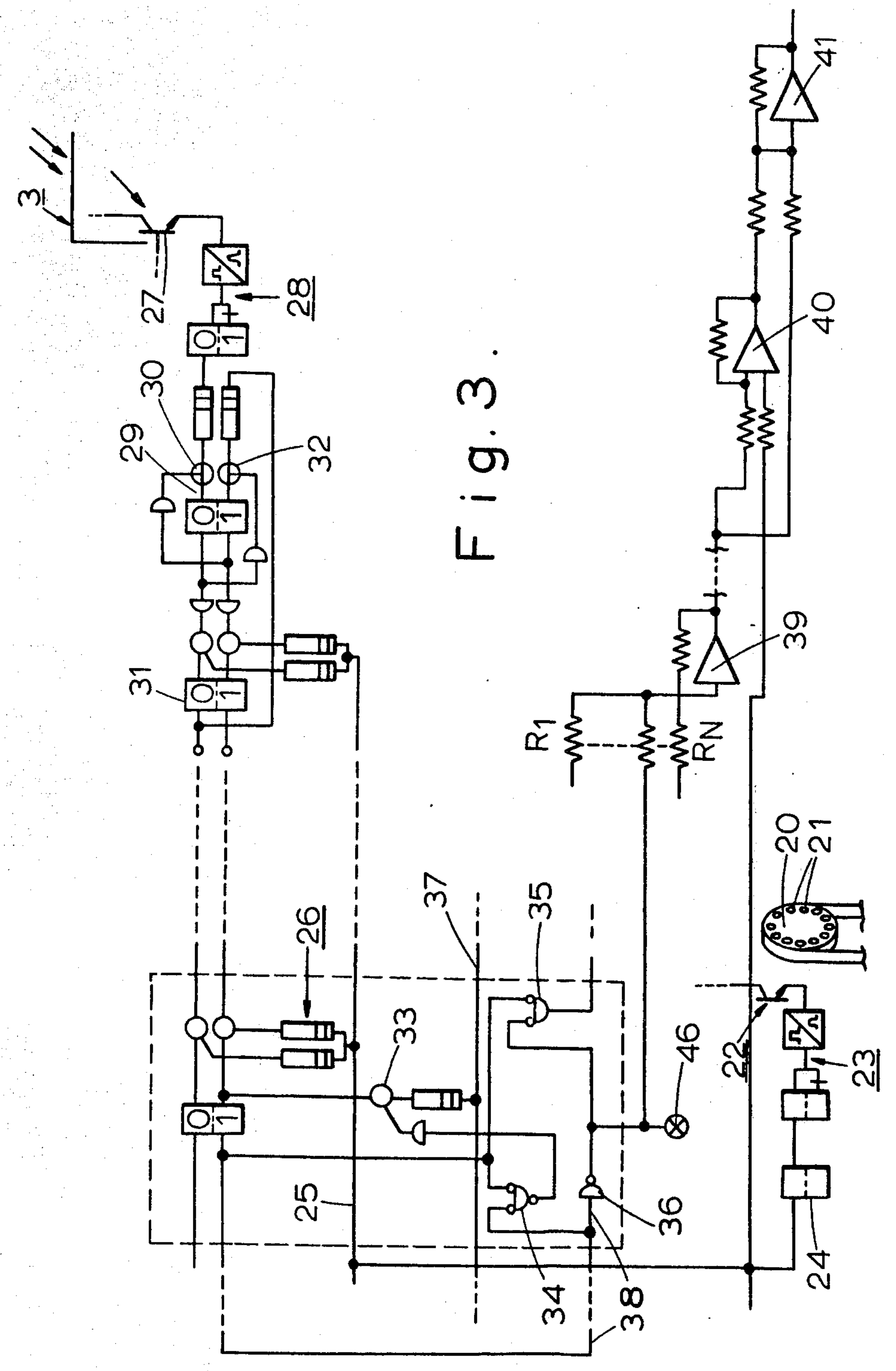
FIG. 3 shows detail of a first embodiment of control circuit for controlling the speed of a letter conveyor of the coding desk.

Reference will now be made to FIG. 3 wherein there is shown one form of a speed control mechanism for controlling the speed of the letter conveyor.

A light beam impinging on a photodetector 22 is periodically interrupted by the passage of a rotating disc 20 having appropriately positioned light transmitting slots or holes 21 cut through it. The disc is driven directly from the drive roller to the letter conveyor 12 so as to have a rotational speed directly proportional to the speed of the letter conveyor 12. The output of the photodetector 22 is fed through a Schmitt trigger 23 to trigger a monostable 24. Output pulses from the monostable 24 are of fixed duration and have a pulse frequency corresponding to the speed of the letter conveyor 12.

Shift pulses from the monstable 24 are applied along a shift pulse line 25 to the pulse inputs of a series of pulse-plus-bias gates 26 to drive a shift register. The stages of the shift register are normally in logic 0 state. A second photodetector beam when interrupted by the passage of the leading edge of each incoming letter 3 at the input end of the viewing screen 2 actuates a photodetector 27 to pass a corresponding pulse to a Schmitt trigger 28 which thereupon changes to a logic 1 state and remains in that state as long as the photo electric beam is cut by the passage of the letter 3. The logic 1 state is transferred to a bistable 29 by the pulse side of a pulse-plus-bias gate 30 and the bistable flips to logic 1. On a shift pulse being applied to the shift pulse line 25, the logic 1 is transferred to the first stage 31 of the shift register. Subsequently a logic 1 is returned from the output of the first stage of the shift register through a second pulse-plus-bias gate 32 to restore the bistable 29 to logic 0.

An intermediate stage of the shift register is shown in FIG. 3 together with an associated gating circuit. The gating circuit is typical of gating circuits associated with the other shift register stages and its operation will now be described in detail.

The gating circuit generally comprises a pulse-plus-bias gate 33, a NOR gate 34, a NAND gate 35 and an inverter 36 connected as shown in FIG. 3. Inputs to the circuit comprise a reset line 37, and a data transfer line 38 from the NAND gate output on the previous stage. At the completion of keying of each multicharacter code, i.e. an establishment of a code, a pulse is applied along the reset line. The pulse is applied via the pulse-plus-bias gate 33 to reset the shift register stage corresponding to the leading edge of the letter for which the code has been established. The operation of the gating circuit can be explained by reference to the following table:

| Logic state of SR stage | Logic conveyed from previous gating circuit along data transfer line | Logic Output of NOR gate | Logic Output of NAND gate |
|---|---|---|---|
| 0 | 0 | 0 | 0 (No previous SR stage to be reset) |
| 1 | 0 | 1 (SR stage to be reset) | 1 (Previous SR stage to be reset) |
| 1 | 1 | 0 | 1 (Previous SR stage to be reset) |
| 0 | 1 | 0 | 1 (Previous SR stage to be reset) |

The effect of the gating circuit is thus that all outputs corresponding to letters up to and including the leading edge of the foremost letter for which a code has to be established are at logic 1, the other outputs being at logic 0.

Selected ones of the gating circuit outputs are applied through respective resistances $R_1$ to $R_N$ to a summing amplifier 39.

The output of the summing amplifier is a voltage equivalent to the required speed of the letter conveyor 12. This voltage is compared with a voltage equivalent to the measured speed of the letter conveyor at a comparator 40. This latter voltage is derived from the output of the monostable 24, the pulse repetition rate of which is proportional to the speed of the letter conveyor 12. The comparator output is the voltage equivalent to the difference in required and measured speeds of the letter conveyor 12 and is summed at an amplifier 41 with the voltage equivalent to the letter conveyor required speed.

The d.c. control signal from the control circuit is thus of the form $$Vo = Vr + (Vr - Va)\, n.$$

Where Vo is the control signal voltage, Vr is the signal voltage which when applied to a letter conveyor motor under steady state conditions gives the required motor speed, and Va is the voltage equivalent of the measured speed of the motor. The feedback index n provides an improved response and a closer adherance of the motor speed to the conveyor speed.

Figure 5I:
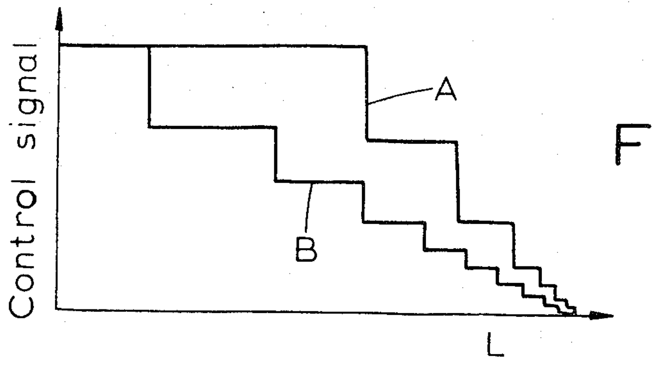
FIG. 5 (i) shows a graphical representation of a speed control signal for the coding desk conveyor as a function of the distance L travelled by letters along a veiwing screen, in the absence of keying, but using the control circuit of FIG. 3.
Figure 5:
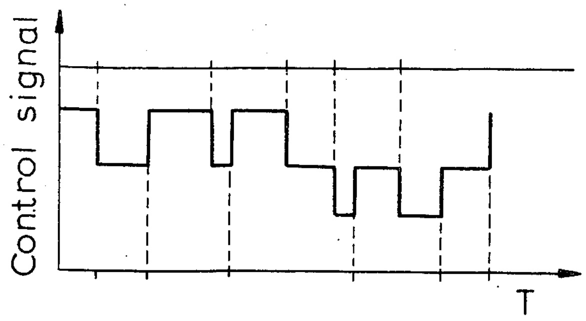
Figure 5:
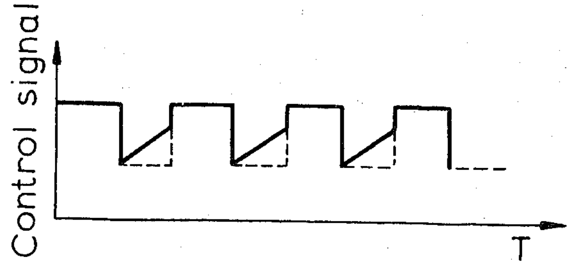

The gating circuit outputs selected for connection to the resistances $R_1$ to $R_N$ and the magnitudes of the resistances, are chosen so as to obtain a desired deceleration profile for the movement of the letter conveyor. Thus as shown in FIG. 5 (i), for fast and slow operators, respectively deceleration profiles similar to A and B could be utilised. The profiles shown represent movement of the letter conveyor in the absence of any codes being keyed. FIG. 5 (ii) shows a graphical representation of the conveyor speed control signal as a function of time T while codes are being keyed by the operator. Because the clarity of the addresses from which the codes are derived may be different and having regard to the range of lengths of codes to be keyed, the time taken for keying the codes will vary. Hence, FIG. 5 (ii) typifies the movement of the letter conveyor 12 during establishment of codes for a random selection of letters. The times at which the conveyor is accelerated on completion of the code and decelerated on the foremost unkeyed letter reaching particular locations in the viewing screen 2 are indicated respectively below and above the plot. Since the gating circuit changes the voltage applied to the letter conveyor motor in discrete steps, the deceleration will also be stepped. The steps can be made less significant to avoid rapid readjustment of the operator's eye movement by connecting all the gating circuit outputs through resistances to the summing amplifier 39. This will have the effect of making the deceleration steps small but very closely spaced along the viewing screen 2. In a preferred embodiment, however, the output of the amplifier is taken to the input of a saturable reactor (not shown) the output of the saturable reactor being fed to a slip induction motor (not shown) to drive the letter conveyor. The saturable reactor is used to interface between the voltage from the control circuit and the a.c. power required by the motor. In addition, by the use of the saturable reactor the reaction of the motor is damped. FIG. 5 (iii) shows the plot of FIG. 5 (ii) when the saturable reactor is included between the control circuit and the motor.

In another embodiment of the invention, the letter position information used to control the speed of the motor is modified by adding to it information related to the speed at which a particular code for a letter is being keyed or established. Thus in the United Kingdom postal system a multicharacter postal code is used on letters, this postal code being keyed at the keyboard 4, the code then being translated to a 28 bit sorting code which is printed on the letter at the print unit 13.

Figure 4:
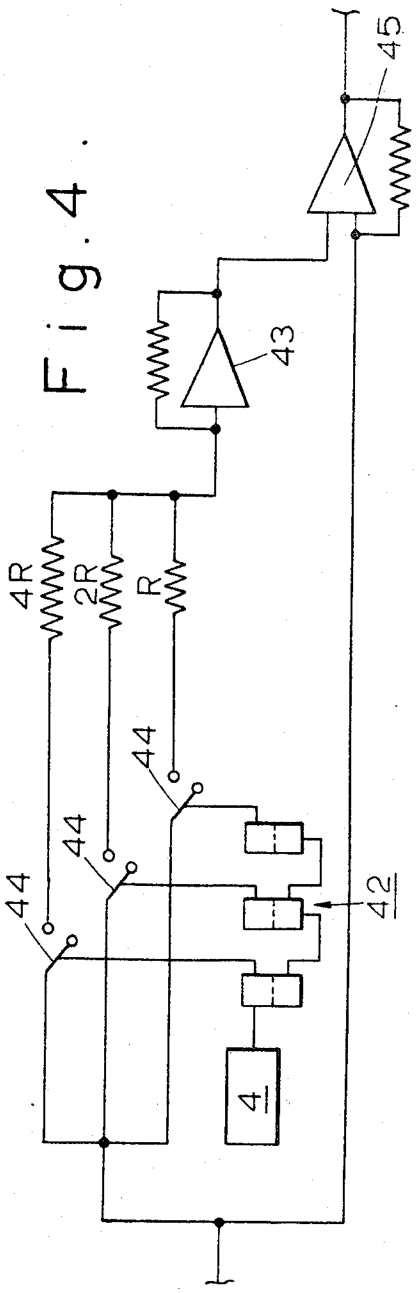
FIG. 4 shows details of a second embodiment of control circuit adapted to be incorporated into the circuit of FIG. 3 for controlling the speed of the letter conveyor for the coding desk.

Circumstances are to be considered in which a desk operator is keying a series of letters at the same rate and is using a portion of the viewing screen 4 where one reduction in the speed of the letter conveyor 12 occurs between every pair of codes keyed. A sudden readjustment of the operator's eye movement could be required each time the letter conveyor 12 slows down and each time the letter conveyor speeds up an establishment of a code. A keystroke monitor used to partially obviate this sudden readjustment of eye movement will now be described with reference to FIG. 4. A binary counter 42 records when each keying stroke is made and, according to the number of strokes counted, a voltage applied to a summing amplifier 43 is varied. The outputs from each of the three stages of the counter are taken to respective switches 44 which selectively enable a voltage equivalent to the required speed of the previous embodiment to be fed through weighted resistances R, 2R and 4R to be summed at the amplifier 43.

Thus the output of the amplifier 43 is increased in direct proportion to the number of keying strokes performed, the output however being modified by the letter position control information, so that for identical key stroke counts the output will be smaller for a letter positioned near the output end of the viewing screen 2 than for a letter positioned at the input end.

The keystroke monitor control information and the letter position control information are then summed at a further summing amplifier 45, the output of the amplifier, which is the voltage equivalent to the required letter conveyor speed of this embodiment, then being utilised in a manner similar to the voltage equivalent of the required speed of the previous embodiment, to control the motor speed.

The output of the control circuit of this embodiment is typified by the conveyor speed/time plot of FIG. 5 (iv)

Figure 6:
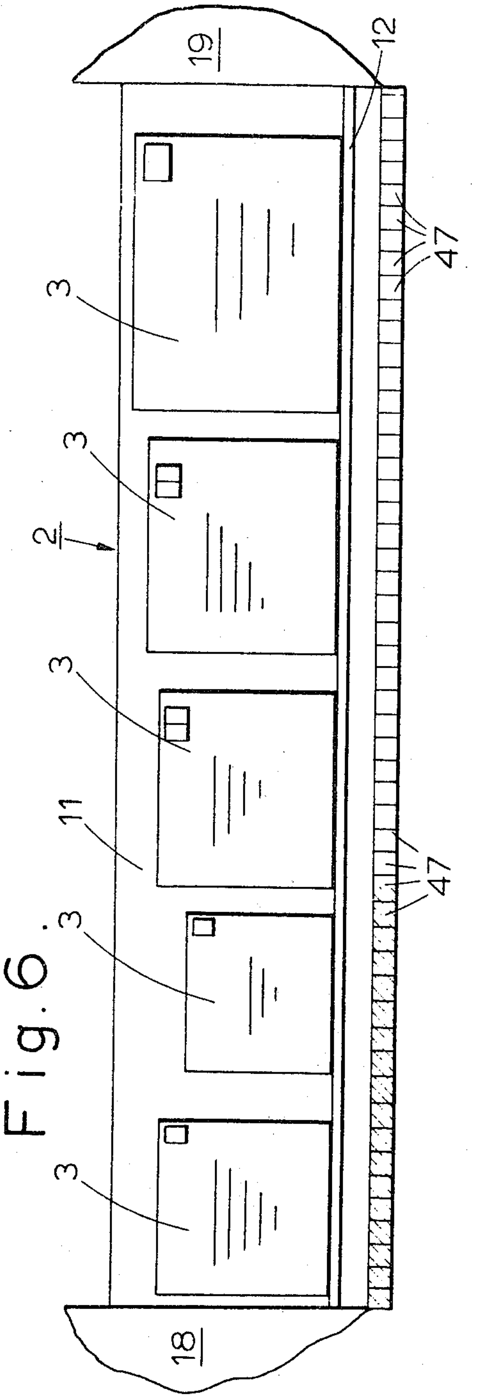
FIG. 6 shows the viewing screen and a letter position indicator of the coding desk.

Auxiliary outputs are taken from each of the gating circuits to light indicator lamps 46 (FIG. 3). The lamps are spaced along the desk 1 as shown in FIG. 6 and provide diffuse lighting of a series of acrylic plastics blocks 47 to indicate to the desk operator for which of the succession of letters 3 in the viewing screen 2 he has yet to key a code.

What is claimed is:

1. Article classifying apparatus comprising:

conveying means for conveying articles seriatim from an input station past a work station to an output station;

code establishing means at the work station for establishing classification codes in the form of machine-readable signals specific to successive ones of the articles according to the identities thereof;

monitoring means for monitoring the position of the foremost article for which a code has not been established; and control means simultaneously under the control of said code establishing means and said monitoring means for varying the speed of the conveying means in accordance with the position of said foremost article so that if a code is established for that article when it is near the input station, said conveying means moves faster than if a code is established for that article when it is near the output station.

2. Article classifying apparatus according to claim 1 wherein said monitoring means is arranged to provide an output signal having a mangitude proportional to the distance from the input station of the foremost article for which a code has not been established, said output signal being connected to vary the speed of drive means for said conveying means.

3. Apparatus according to claim 2 wherein said monitoring means includes a shift register synchronously driven with movement of said conveying means.

4. Apparatus according to claim 3 wherein output signals from a sequence of stages of the shift register are used to initiate the speed control signal for varying the speed of said conveying means, said speed control signal having a magnitude proportional to the distance from the input station of the foremost article for which a code has not been established.

5. Apparatus as claimed in claim 4 wherein said sequence is changeable so as to effect a corresponding change in the proportionality between signal magnitude and distance.

6. Apparatus according to claim 5 wherein said monitoring means includes detector means for detecting the position of one end of each article at the input station.

7. Apparatus according to claim 6 wherein said classification code is a multicharacter code which is established by successively keying the characters of the code at a keyboard, the apparatus further including second control means for further varying the speed of said conveying means in accordance with the number of characters of a code that have been keyed.

8. Apparatus according to claim 7 wherein said second control means includes a binary counter for counting the number of characters of a particular multicharacter code that have been keyed.

9. Apparatus according to claim 1 wherein a line of indicator lamps are provided adjacent to said conveying means and aligned with the articles between the input and output stations, the arrangement being such that illumination of the lamps is controlled by the control means so that the illumanated lamps articles have yet to have a code established therefor.

10. A method of classifying articles comprising:

conveying articles seriatim from an input station past a work station to an output station;

successively establishing classification codes in the form of machine-readable signals specific to successive ones of the articles according to the identities thereof;

monitoring the position of the foremost article for which a code has not been established; and varying the speed of conveyance of the articles in accordance with the position of said foremost article so that if a code is established for that article when it is near said input station, the speed of conveyance is faster than if a code is established for that article when it is near the output station.

11. A method according to claim 10 wherein the speed of conveyance of the articles by applying a signal having a magnitude proportional to the distance from the input station of said foremost article to drive means for driving said conveying means.

12. A method according to claim 11, further comprising providing a visual indication as to which ones of the articles between said input and output stations have yet to have a code established therefor.

* * * * *